(12) United States Patent
Arbogast

(10) Patent No.: US 8,429,527 B1
(45) Date of Patent: Apr. 23, 2013

(54) COMPLEX DATA MERGING, SUCH AS IN A WORKFLOW APPLICATION

(75) Inventor: Emmanuel Arbogast, Newcastle, WA (US)

(73) Assignee: Open Text S.A., Luxembourg (LU)

( * ) Notice: Subject to any disclaimer, the term of this patent is extended or adjusted under 35 U.S.C. 154(b) by 1232 days.

(21) Appl. No.: 11/486,397

(22) Filed: Jul. 12, 2006

Related U.S. Application Data

(60) Provisional application No. 60/698,678, filed on Jul. 12, 2005, provisional application No. 60/698,700, filed on Jul. 12, 2005.

(51) Int. Cl.
*G06F 17/00* (2006.01)

(52) U.S. Cl.
USPC ............. 715/255; 715/200; 715/234

(58) Field of Classification Search .......... 715/200, 715/205, 224–225, 234, 255, 209–210, 221, 715/236; 705/7
See application file for complete search history.

(56) References Cited

U.S. PATENT DOCUMENTS

| | | | |
|---|---|---|---|
| 5,339,423 A | 8/1994 | Beitel et al. | |
| 5,649,220 A | 7/1997 | Yosefi | |
| 5,966,512 A | 10/1999 | Bates et al. | |
| 5,974,418 A * | 10/1999 | Blinn et al. | 707/100 |
| 6,196,393 B1 | 3/2001 | Kruk et al. | |
| 6,249,291 B1 | 6/2001 | Popp | |
| 6,330,006 B1 | 12/2001 | Goodisman | |
| 6,339,838 B1 | 1/2002 | Weinman, Jr. | |
| 6,415,259 B1 | 7/2002 | Wolfinger et al. | |
| 6,429,880 B2 | 8/2002 | Marcos et al. | |
| 6,430,538 B1 | 8/2002 | Bacon et al. | |
| 6,437,805 B1 | 8/2002 | Sojoodi et al. | |
| 6,442,563 B1 | 8/2002 | Bacon et al. | |
| 6,484,150 B1 * | 11/2002 | Blinn et al. | 705/26 |
| 6,493,731 B1 | 12/2002 | Jones et al. | |
| 6,553,563 B2 | 4/2003 | Ambrose et al. | |
| 6,621,505 B1 | 9/2003 | Beauchamp et al. | |
| 6,745,221 B1 | 6/2004 | Ronca | |
| 6,860,422 B2 | 3/2005 | Hull et al. | |
| 6,874,146 B1 | 3/2005 | Iyengar | |

(Continued)

FOREIGN PATENT DOCUMENTS

WO PCT/AU03/00954 * 5/2004

OTHER PUBLICATIONS

LeVitus et al, 'MacWorld Microsoft Office 2001 Bible', IDG Books Worldwide, Inc, 2001, pp. 163-178.*

(Continued)

*Primary Examiner* — Thu Huynh
(74) *Attorney, Agent, or Firm* — Sprinkle IP Law Group

(57) ABSTRACT

Merging data for use in a workflow application may include providing a user interface that facilitates collecting information from a user such as an indication of a first document and a second document that each include multiple records, a selection of a key indicator field common to both documents, and some indication of which of the two documents is a controlling document. Without the need for the user providing programming instructions, the workflow application joins information from both documents by identifying whether any of the records from the non-controlling document has a key indicator value that matches the key value of a select record from the controlling document. Based on this identifying, the workflow application dynamically generates a merged document which it can then use to perform one or more actions.

24 Claims, 11 Drawing Sheets

U.S. PATENT DOCUMENTS

| | | |
|---|---|---|
| 6,904,412 B1 | 6/2005 | Broadbent et al. |
| 6,968,503 B1 | 11/2005 | Chang et al. |
| 6,975,914 B2 | 12/2005 | DeRemer |
| 6,990,654 B2 | 1/2006 | Carroll, Jr. |
| 7,017,123 B2 | 3/2006 | Chickles et al. |
| 7,076,728 B2 | 7/2006 | Davis et al. |
| 7,124,373 B1 | 10/2006 | Patil |
| 7,127,716 B2 | 10/2006 | Jin et al. |
| 7,134,090 B2 | 11/2006 | Kodosky et al. |
| 7,143,343 B2 | 11/2006 | Bender et al. |
| 7,159,185 B1 | 1/2007 | Vedula et al. |
| 7,161,108 B2 | 1/2007 | O'Connell et al. |
| 7,194,692 B2 | 3/2007 | Marcos et al. |
| 7,194,737 B2 | 3/2007 | Amodio et al. |
| 7,321,864 B1 | 1/2008 | Gendler |
| 7,426,548 B2 | 9/2008 | Griffin et al. |
| 7,428,495 B2 | 9/2008 | Dhar et al. |
| 7,483,902 B2 | 1/2009 | Ghai et al. |
| 7,500,185 B2 | 3/2009 | Hu |
| 7,539,982 B2 | 5/2009 | Stuart |
| 7,634,756 B2 | 12/2009 | Bjornson et al. |
| 7,640,548 B1 | 12/2009 | Yu et al. |
| 7,788,214 B2 | 8/2010 | Fernandez et al. |
| 7,917,888 B2 | 3/2011 | Chang et al. |
| 7,945,093 B2 | 5/2011 | Fowler |
| 8,082,189 B2 | 12/2011 | Fushimi et al. |
| 8,090,612 B2 | 1/2012 | Chao et al. |
| 2001/0045963 A1 | 11/2001 | Marcos et al. |
| 2002/0007405 A1 | 1/2002 | Bahadur |
| 2002/0029376 A1 | 3/2002 | Ambrose et al. |
| 2002/0085020 A1 | 7/2002 | Carroll |
| 2002/0165912 A1 | 11/2002 | Wenocur et al. |
| 2003/0093433 A1 | 5/2003 | Seaman et al. |
| 2003/0093755 A1* | 5/2003 | O'Carroll ............... 715/500 |
| 2004/0003353 A1 | 1/2004 | Rivera et al. |
| 2004/0006598 A1* | 1/2004 | Bargagli Damm et al. ... 709/206 |
| 2004/0078258 A1 | 4/2004 | Schultz et al. |
| 2004/0088647 A1 | 5/2004 | Miller et al. |
| 2004/0127279 A1 | 7/2004 | Gatto et al. |
| 2004/0236835 A1 | 11/2004 | Blankenship |
| 2004/0250213 A1 | 12/2004 | Shalabi et al. |
| 2005/0015746 A1 | 1/2005 | Shukla et al. |
| 2005/0066287 A1 | 3/2005 | Tattrie et al. |
| 2005/0066304 A1 | 3/2005 | Tattrie et al. |
| 2005/0102608 A1* | 5/2005 | Batres ...................... 715/505 |
| 2005/0114405 A1 | 5/2005 | Lo |
| 2005/0216830 A1* | 9/2005 | Turner et al. ............. 715/513 |
| 2005/0262429 A1 | 11/2005 | Elder et al. |
| 2005/0262430 A1* | 11/2005 | Croft ........................ 715/507 |
| 2005/0273272 A1 | 12/2005 | Brando et al. |
| 2006/0004827 A1 | 1/2006 | Stuart |
| 2006/0047665 A1 | 3/2006 | Neil |
| 2006/0259524 A1 | 11/2006 | Horton |
| 2006/0282473 A1 | 12/2006 | Horrocks et al. |
| 2007/0192402 A1 | 8/2007 | Dean et al. |
| 2008/0189679 A1 | 8/2008 | Rodriguez et al. |
| 2008/0275907 A1* | 11/2008 | Han et al. ................. 707/102 |
| 2008/0278740 A1* | 11/2008 | Bird et al. ................ 358/1.15 |
| 2010/0070945 A1 | 3/2010 | Tattrie |

OTHER PUBLICATIONS

International Search Report and Written Opinion; International Patent Application No. PCT/US07/68825; Filed May 11, 2007; Applicant; Captaris, Inc.; Mailed: Jul. 17, 2008; 12 pages.

Dan et al., "Web services on demand: WSLA-driven automated management," IBM Systems, Journal, vol. 43, No. 1, 2004, pp. 136-158.

Office Action issued in U.S. Appl. No. 11/486,398, mailed Jul. 26, 2010, 16 pages.

"Captaris Announces Teamplate for .NET 4.1," CMSWire, Apr. 4, 2004, printed from http://www.cmswire.com/cms/portal/captaris-announces-template-for-net-41-000271.php on Jul. 14, 2010, 3 pages.

"Captaris Workflow, powered by Teamplate," Captaris, 2005, 3 pages.

"Captaris Workflow Technical Overview," Captaris, 2005, 4 pages.

Chen, Qiming, et al., "Multi-Agent Cooperation, Dynamic Workflow and XML for E-Commerce Automation," HP Laboratories Palo Alto, Oct. 1999, 10 pages.

Wang, Alf Inge, "Experience Paper: Using XML to Implement a Workflow Tool," NTNU, Trondheim, Norway, Apr. 4, 2001, 7 pages.

Tripathy, Anand R., et al., "Implementing Distributed Workflow Systems from XML Specifications," University of Minnesota Department of Computer Science, 2000, 9 pages.

Filho, Roberto Silveira Silva, "A Fully Distributed Architecture for Large Scale Workflow Enactment," International Journal of Cooperative Information Systems, vol. 12, No. 4, 2003, 16 pages.

Kay, Michael, "Building Workflow Applications with XML and Xquery," DataDirect Technologies, Inc., 2006, 10 pages.

Shegalov, German, et al., "XML-Enabled Workflow Management for E-Services Across Heterogeneous Platforms," The VLDB Journal, vol. 10, 2001, 13 pages.

Stauch, Marc, et al., "Design and Implementation of an XSL-T and XML-based Workflow System," XML Europe, 2001, 18 pages.

Examiner's Report for Canadian Patent Application No. 2,451,164, mailed Feb. 16, 2011, 4 pgs.

Office Action issued in U.S. Appl. No. 10/938,118, mailed Oct. 29, 2007, 32 pages.

Office Action issued in U.S. Appl. No. 10/938,118, mailed May 14, 2008, 27 pages.

Office Action issued in U.S. Appl. No. 10/938,118, mailed Jan. 14, 2009, 21 pages.

Castellanos, et al., "IBOM: A Platform for Intelligent Business Operation Management," Proceedings of the 21st International Conference on Data Engineering, 2005, pp. 1-12.

Continuous Business Process Management with HOLOSOFX BPM Suite and IBM MQSeries Workflow, ibm.com/redbooks, May 2002, p. 1-534.

Gannon, et al., "A Quick Tour of LEAD via LEAD Portal & Application Orchestration," Indiana University, Jul. 21-22, 2005, p. 1-46.

Schmidt, "Building Workflow Business Objects," OOPSLA '98 Business Object Workshop IV, 1998, p. 1-14.

Senkul and Torosola, "An Architecture for Workflow Scheduling Under Resource Allocation Constraints," Information Systems 30 (2005), p. 399-422.

Office Action issued in U.S. Appl. No. 10/938,118, mailed Nov. 3, 2009, 17 pages.

Office Action issued in U.S. Appl. No. 11/486,398, mailed Nov. 9, 2010, 20 pages.

Captaris, "Alchemy Workflow Solutions—Datasheet," Captaris, 2005, 4 pages.

Captaris, "Doculabs MarketFocus White Paper: Analysis of the Captaris Solution for Fixed Content Management," Doculabs, 2005, 18 pages.

Captaris, "Nexant Automates Energy Efficiency with Captaris Workflow, Case Study," 2005, 3 pages.

Sparta Systems, Inc., "TrackWise—User's Guide," 2000, 175 pages.

Teamware Group, "Teamware Flow 3.1 User's Guide," Third Edition Apr. 2000, 164 pages.

Marchetti, Andrea et al., "Xflow: An XML-Based Document Centric Workflow," WISE 2005, LNCS 3806, 2005, 14 pages.

Krishnan, Rupa et al., "Xdoc-WFMS: A Framework for Document Centric Workflow Management Lecture Notes in Computer Science," 2002, vol. 2464/2002, pp. 348-362.

Examiner's Report for Canadian Patent Application No. 2,443,454, mailed Jan. 25, 2011, 6 pgs.

Office Action for U.S. Appl. No. 12/396,445 mailed Mar. 13, 2012, 16 pgs.

Office Action for U.S. Appl. No. 11/486,398 mailed Mar. 20, 2012, 36 pgs.

Arpinar, Ismailcem Budak et al., An Efficient Data Extraction and Storage Utility for XML Documents Proceedings of the 39th Annual ACM Southeast Conference, 2001, 6 pages.

IBM DB2: Administering XML Extender (IBM DB2 Help Manual), IBM, 2006, 3 pages.

Berlea, Alexnadru et al, fxt—A Transformation Language for XML Documents, Journal of Computing and Information Technology, vol. 10, 2001, 19 pages.

Hsiao, Hui-I, Advanced Technology for Managing XML Document Collections IEEE, 2005, 4 pages.

Song, Minrong et al., REPOX: An XML Repository for Workflow Design and Specifications, Aug. 26, 2001, 43 pages.

Eder, Johann et al., Composition of Transformations for XML Schema Based Documents, Proceedings of Short Papers of the 7'h East European Conference on Advances in Databases and Information Systems, 2003, 10 pages.

Workflow Management Coalition Workflow Standard—Interoperability Wf-XML, The Workflow Management Coalition. May 1, 2000, 40 pages.

Doucent, Antoine et al., Accurate Retrieval of XML Document Fragments Using EXTI RP, INEX 2003 Workshop Proceedings, 2003, 8 pages.

Tennison, Jeni, Processing XML Documents with Pipelines, DocEng. 06, 2006, 44 pages.

XML Pipeline definition, Wikipedia.org, Retrieved Mar. 16, 2012, 5 pages.

Rossi, Davide, Orchestrating Document-based Workflows with X-Folders, 2004 ACM Symposium on Applied Computing, 2004, 5 pages.

Page, Sam, XSL Pipeline Processing Using XML, 2005, 6 pages.

Pediaditakis, Michael et al., Device neutral pipelined processing of XML documents, WWW2003, 12th International World Wide Web Conference, 2003, 4 pages.

Bae, et al. "A document-process association model for workflow management," Department of Industrial Engineering, Seoul National Univerity, Jun. 7, 2001, 16 pages.

Office Action for U.S. Appl. No. 10/938,118, mailed May 8, 2012, 38 pages.

Office Action for U.S. Appl. No. 11/486,398, mailed Jul. 9, 2012, 35 pages.

"Primary and Foreign Key Constraints," retrieved from http://msdn.microsoft.com/en-us/library/ms179610(d=printer).aspx on Sep. 6, 2012, 5 pages.

Michelle A. Poolet, "SQL by Design: How to Choose a Primary Key," retrieved from http://www.sqlmag.com/print/systems-administrator/sql-by-design-how-to-choose-a-primary-key, dated Apr. 1, 1999, 4 pages.

Examiner's Report issued for Canadian Patent Application No. 2,443,454, mailed Jul. 24, 2012, 6 pages.

* cited by examiner

Define Data Join

Define Data Join

Enter a descriptive title for this join:

LetterInvoiceJoin

Join Structure

Define the Parent-Child relationship for this join, which controls the structure of the resulting output.
The Parent document is the controlling document.

Parent document:
SchemaLink://ContentExtractor1|/Task Parameters/TaskParameter/Output/R1 — 1102

Parent key:
SchemaLink://ContentExtractor1|/Task Parameters/TaskParameter/Output/R1/Recipient — 1104

Child document:
SchemaLink://ContentExtractor2|/Task Parameters/TaskParameter/Output/R1 — 1106

Child key:
SchemaLink://ContentExtractor2|/Task Parameters/TaskParameter/Output/R1/BillToName — 1108

Data Browser    OK    Cancel

COMPLEX DATA MERGING, SUCH AS IN A WORKFLOW APPLICATION

CROSS-REFERENCE TO RELATED APPLICATIONS

This application claims priority to U.S. Provisional Patent Application No. 60/698,678 filed Jul. 12, 2005, entitled "COMPLEX DATA MERGING, SUCH AS IN A VECTOR-BASED WORKFLOW APPLICATION," and U.S. Provisional Patent Application No. 60/698,700, filed Jul. 12, 2005, entitled "WORKFLOW SYSTEMS."

BACKGROUND

Workflow technologies are often used to manage and monitor business processes. For example, workflow technologies allow users to efficiently define and track processes that involve work spanning multiple individuals and/or departments within an organization (or even across organizations). Existing workflow technologies often allow users to automate a range of tasks, which are often dependent on large amounts of specific information. Accordingly, executing a task may involve performing functions (sometimes repeatedly) on large sets of input data.

In general, tasks are created to perform a single or limited set of functions and then combined with other tasks as part of larger processes. Some high-level examples of task functions include retrieving data from a data store, retrieving data from an external application, sending data to a data store, sending data to an external application, re-formatting input data to output data, transforming (computing) data from input to output, deriving new data from input data, relating multiple input streams of data with respect to each other, etc. As a practical example, workflow tasks may be responsible for notifying employees of pending work orders. Likewise, workflow tasks may enable managers to efficiently observe status and route approvals quickly.

Because the demand for workflow technology is high, there are many types of workflow technologies on the market. Most workflow technologies are generally comprised of a package of several software components that provide functionality in areas of both workflow design and workflow execution. In terms of workflow design, these software components sometimes include workflow diagramming functionality having a workspace or canvas used to create workflow diagrams (e.g., specify the placement of tasks and pipes, which define the sequence and flow of information between tasks in a workflow). In facilitating workflow design, the software components of workflow technologies often allow a user to specify parameters and business rules to guide the flow of control, the flow of data, and the functions of tasks. In addition to facilitating the design of workflows, the software components of typical workflow technologies also facilitate the initiation, evaluation, and review of workflows.

In terms of executing workflows, typical workflow technologies include processing capabilities that manage the flow of information along the pipes between tasks, apply business rules to direct execution path and data at pipe junctions, ensure data is passed as input to tasks, ensure user parameter metadata is provided to tasks, monitor and propagate error status of the tasks and pipes, and save and restore job context between sessions. However, existing workflow technologies are often limited in the way that they execute tasks. For example, they typically operate by reading input data one record at a time (with each record limited to similarly shaped data), applying a task (function) to the data, and outputting modified data after performing the task, one record at a time. In other words, in most workflow systems, each task within a workflow inputs, processes, and outputs a single record prior to processing a subsequent record. In such systems, scalability is achieved by invoking parallel instances of a task, although each instance still incurs the individual memory and computational overhead.

Some workflow systems have been designed to support data merging tools that, in executing tasks, enable the merging of different types of input data into a single output document or set of output documents. However, because there are so many different types of data that any given workflow system may need to handle, such merging capabilities are typically implemented using specialized tasks that are custom-designed (e.g., using software programming techniques) for individual cases. Accordingly, for such tools to accommodate additional data types for merging, additional programming is almost always a necessity.

Figure 1:
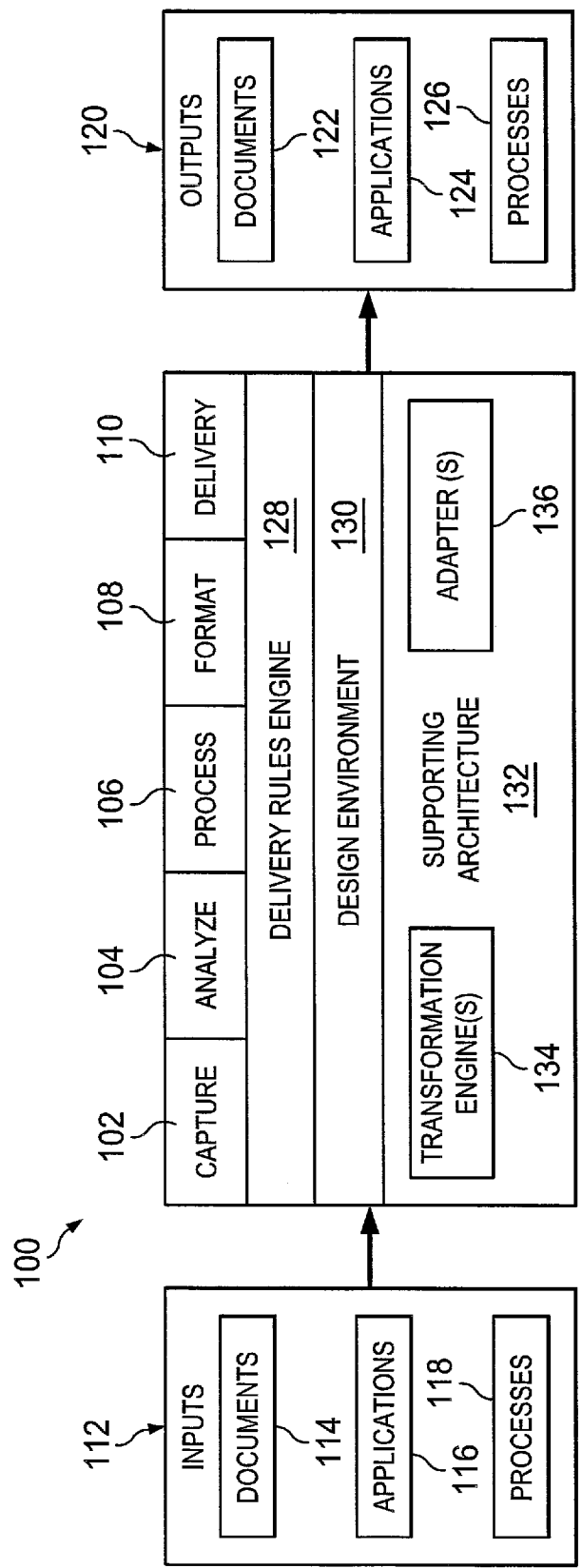
FIG. 1 is a block diagram showing an example of an environment in which a workflow facility having vector-based characteristics and/or complex data merging capabilities may be implemented.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

I. Overview

As described in greater detail below, a software system or facility allows for the efficient creation and management of workflows and other customizable processes that define a sequence of tasks performed to reach a common goal (e.g., a common business goal). In general, the facility allows for merging a wide variety of data into a workflow application by reference to a key indicator, which is a value derived from the document schema. Each of these tasks is typically dependent on information that the workflow application imports, derives, modifies, or exports. For example, a task may depend on the workflow application having the capability to intelligently merge complex data from multiple data sources for the purpose of creating new data for delivery as output. Accordingly, the facility may allow for the definition of complex relationships between multiple documents in a workflow application through the use of complex data merging functionality. This complex data merging functionality is integrated into the infrastructure of the workflow application architecture. For example, the workflow facility may include one or more data transformation engines that intercept input data used in performing tasks prior to the input data being passed to one or more processing modules (e.g., adapters) that perform the actual work associated with the task. In some cases, to implement a hierarchical join, such transformation engines perform data analysis, data relationship rule application, sorting, filtering, and manipulation as needed to complete the join. The output of the transformation engine may be a revised single input document having a specified shape, name, etc.

For example, complex merging functionality may be used to define the relationships among items of data in multiple independent input XML documents. In another example, the complex merging functionality may be used to qualify items of data and their mappings to identify how different items of data match and relate to each other. In various cases, the complex merging functionality may also be used to generate a single input XML document with merged information that matches a target formal input schema.

In some embodiments, every task in a workflow can take advantage of the facility's merging capabilities without having to enable specially programmed tasks. In this way, opportunities to merge disparate data are greater, as no special tasks need be written to merge data once it is inputted into the system.

In some embodiments, when creating new workflows, workflow designers may access the complex merging functionality via a graphical user interface in a way that does not require additional programming to enable the merge of data from multiple data sources. Moreover, the complex merging functionality may be configured so that it is generally applicable to any data being passed through the system, at any time, with the shape (e.g., size and configuration) of the output data determined at run-time and driven by the results of the merging process. Thus, the complex merging functionality is flexible in that it can be applied to a variety of data sources (including new data sources) without the need for additional programming of the workflow facility. In some embodiments, the facility's complex merging functionality may be defined and managed at the workflow application level (as opposed the task level).

In addition to including functionality for complex data merging, the workflow facility may be configured as a vector-based workflow facility that is configured to retrieve and manage a collection of records (as opposed to a single record) for processing in association with a task. In other words, each time the workflow facility invokes a task or action, the task or action can act on a collection of records (e.g., a sequence) as opposed to a single record, thus resulting in more efficient workflow execution.

II. Example System Architecture

FIG. 1 is a block diagram showing an example of a system environment 100 in which aspects of the workflow facility can be implemented. The system environment 100 may include various components, thereby allowing the workflow facility to perform various processes. Examples of such processes may include information capture processes 102, information analysis processes 104, information processing processes 106, information formatting processes 108, information delivery processes 110, etc.

The workflow facility's information capture processes 102 are used to retrieve information for use by the workflow facility in performing various actions. In performing information capture processes 102, the workflow facility may capture content from various input sources 112, which may include common business applications (e.g., systems such as Great Plains software, SAP applications, etc.). Examples of content captured from the input sources 112 include documents 114, processes 116, and applications 118. In general, the workflow facility is configured to capture both content that is internal to the workflow facility and content that is external to the workflow facility.

The workflow facility's information analysis processes 104 are used to manage and organize captured information so that the captured information can be handled most appropriately by the workflow facility during processing. For example, in performing information analysis processes 104, the workflow facility may identify or categorize the captured content (e.g., identify it as a purchase order, an invoice, etc.) and then associate the content with an appropriate business process. Accordingly, the information analysis processes 104 allow the workflow facility to effectively handle a wide variety of content and data. In some embodiments, the information analysis processes 104 are implemented using one or more transformation engines 134 (shown as part of a supporting architecture 132), which perform processing associated with data analysis, data relationship rule application, sorting, filtering, data manipulation, etc.

The workflow facility's information analysis processes 104 are often followed by information processing processes 106. The processing of captured content using the information processing processes 106 may include transforming aspects of data from the captured content into HTML and extracting specific fields or areas of information to produce output data 120 into a standard format such as XML. In some embodiments, the information processing processes 106 are implemented using one or more adapters 136 (shown as part of the supporting architecture 132).

An adapter 136 may be specific to a designated function. Examples of different types of adapters 136 include adapters for data capture, adapters for report generation, and adapters for information delivery (e.g., email adapter, fax adapter, SMS adapter, etc.). In some embodiments, each adapter 136 may be hosted inside of a unique Windows service. For example, a Service Control Manager (SCM) can be used to start or stop each adapter process. Each adapter may include a unique task performer component, which provides the specialized task processing capabilities associated with each adapter 136 (e.g., generate report vs. send batch email). When more processing power is needed, a group of adapters 136 can be used to process task requests. In this case, load balancing happens between all adapters 136 in the group.

To allow delivery of different types of output to different types of systems, output resulting from the information processing processes 106 may be formatted by one or more information formatting processes 108. For example, the information formatting processes 108 may use a template approach to format output data so that it conforms to an external system or so that it meets fidelity and quality requirements for a particular delivery method to be used.

The workflow facility may rely on information delivery processes 110 that allow formatted output to be delivered to an intended recipient. Such information delivery processes 110 may be associated with various delivery methods (e.g., fax, email, print, web (HTML, XML), wireless (SMS for mobile devices), etc.). The information delivery processes 110 may be configured to work with technologies capable of high-volume, simultaneous multi-channel delivery, making communication with customers, partners, suppliers, and employees more personalized and cost-effective. For example, one delivery process may be associated with automatically sending out large numbers of emails or faxes in single batches. In some embodiments, delivery may include delivery to a process or even delivery to a data store.

The complex data merging performed by the workflow facility, which is described in more detail with respect to FIGS. 6-12, may rely on a combination of the processes described above (102-110). For example, after a user specifies documents having data to be merged, the information capture processes 102 may be used to retrieve the information and the information analysis processes 104 may be used to organize it prior to the joining. The joining/merging of the data itself may be performed by one or more of the information processing processes 106. The resulting output (including the requested merged information) may then be formatted using one or more of the information formatting processes 108. Finally, the information delivery processes 110 may be used for delivery of the output, as appropriate. Examples of different types of output data that result from the workflow facility's information processing processes 106 include documents 122, applications 124, and processes 126.

The various components that make up the workflow facility and enable it to perform various processes, including the processes described above (102-110), include a delivery rules engine 128, a design environment 130, and various aspects of the supporting architecture 132. For example, the delivery rules engine 128 performs tasks such as data acquisition, identification, functional processing, output preparation, formatting, and delivery. Accordingly, the delivery rules engine 128 may provide support for many of the processes associated with the workflow facility, including intelligent routing between the information capture processes 102, the information analysis processes 104, the information processing processes 106, the information formatting processes 108, and the information delivery processes 110.

Figure 10:
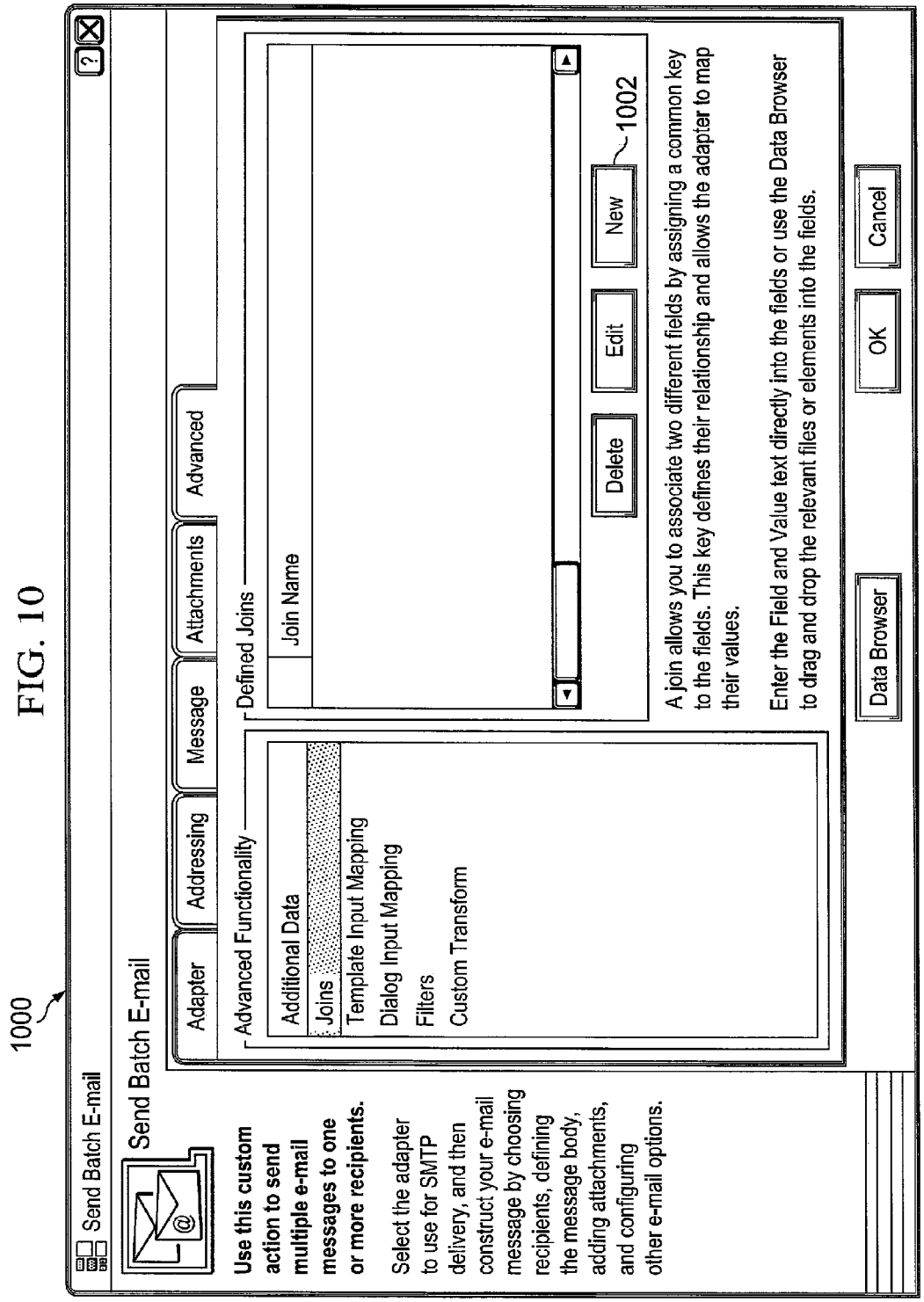
FIGS. 10-12 are display diagrams showing views or screens of a user interface for use in designing a join or merge at a workflow facility in association with defining a task or action.
Figure 11B:
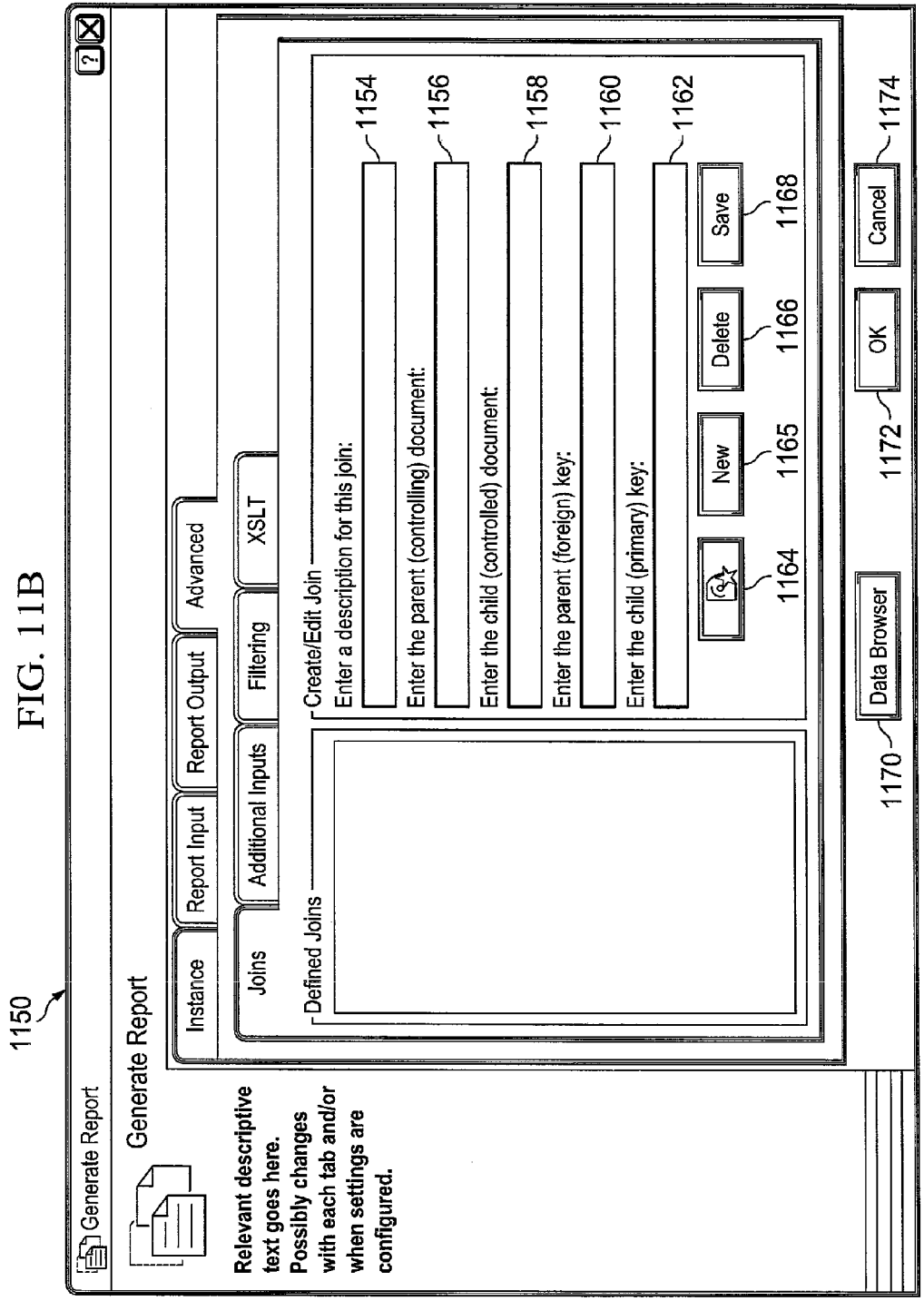
Figure 12:
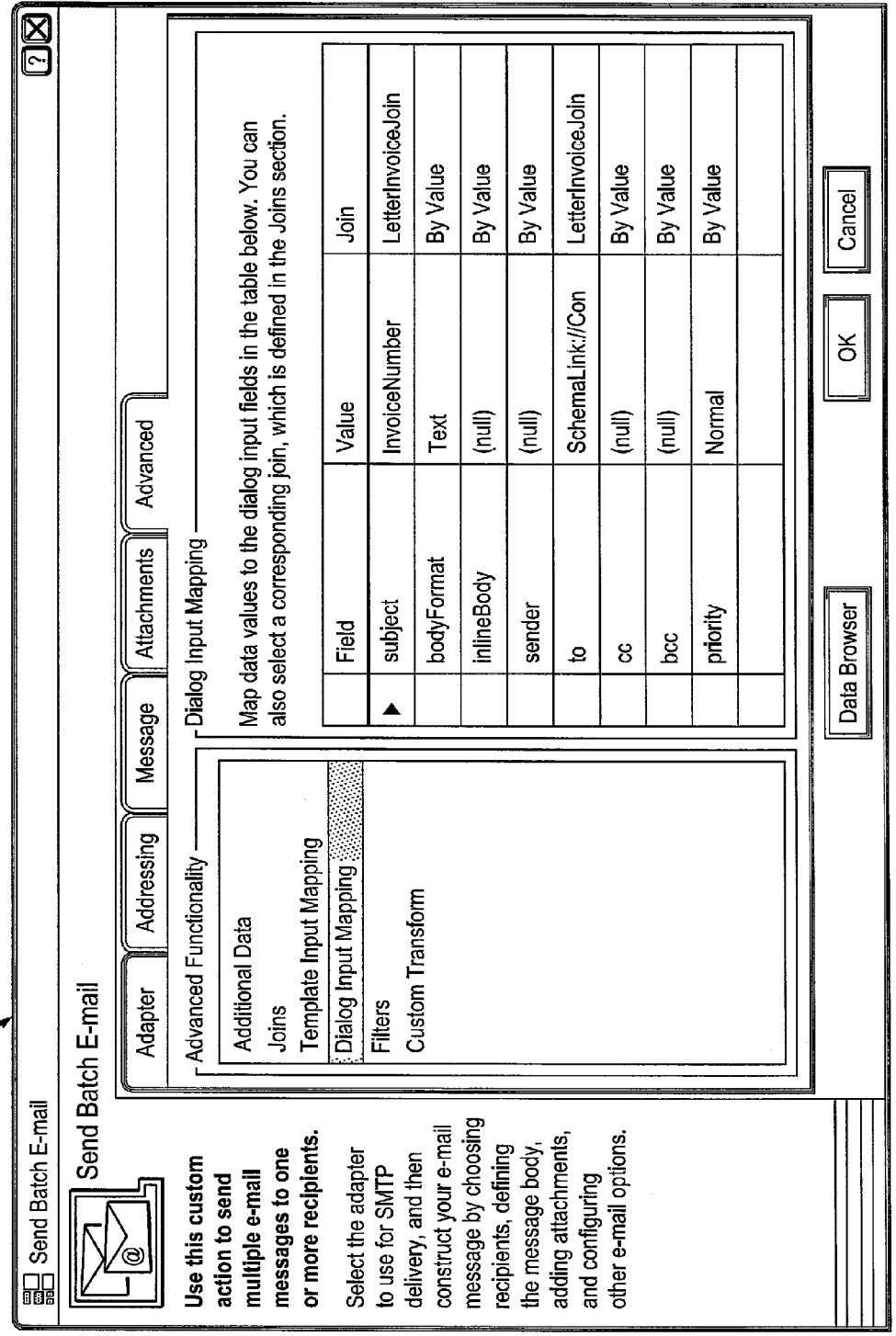

The design environment 130 generally serves as an interface for administrators of the workflow facility (including both software developers and individuals with more basic programming skills). For example, the design environment 130 provides various design, management, reporting, and administration tools/functionality. The features of the design environment 130 may enable developers to open an existing model, start with a blank model design canvas, or optionally use a predefined model created externally (e.g., a Visio diagram) to start development. In this way, administrators can customize the workflow facility for the needs of a particular organization. The creation of a workflow model may include designing custom actions to be performed by the workflow facility, designing custom end-user interfaces, and specifying input sources 112 and output sources 120. The design environment 130 may also provide aspects of one or more end-user interfaces that are configured for users who do not have programming skills. FIGS. 10-12, which relate to complex data merging, provide examples of such end-user interfaces. In particular, these end-user interfaces allow users to provide simple input parameters that allow for complex data merging without otherwise having to know how to manipulate databases (e.g., via SQL commands). In many cases, these end-user interfaces provide dropdown menus and browsing options to make data selection as easy as possible. For more complex activities, wizards may be provided to guide users in specifying the appropriate input.

Figure 2:
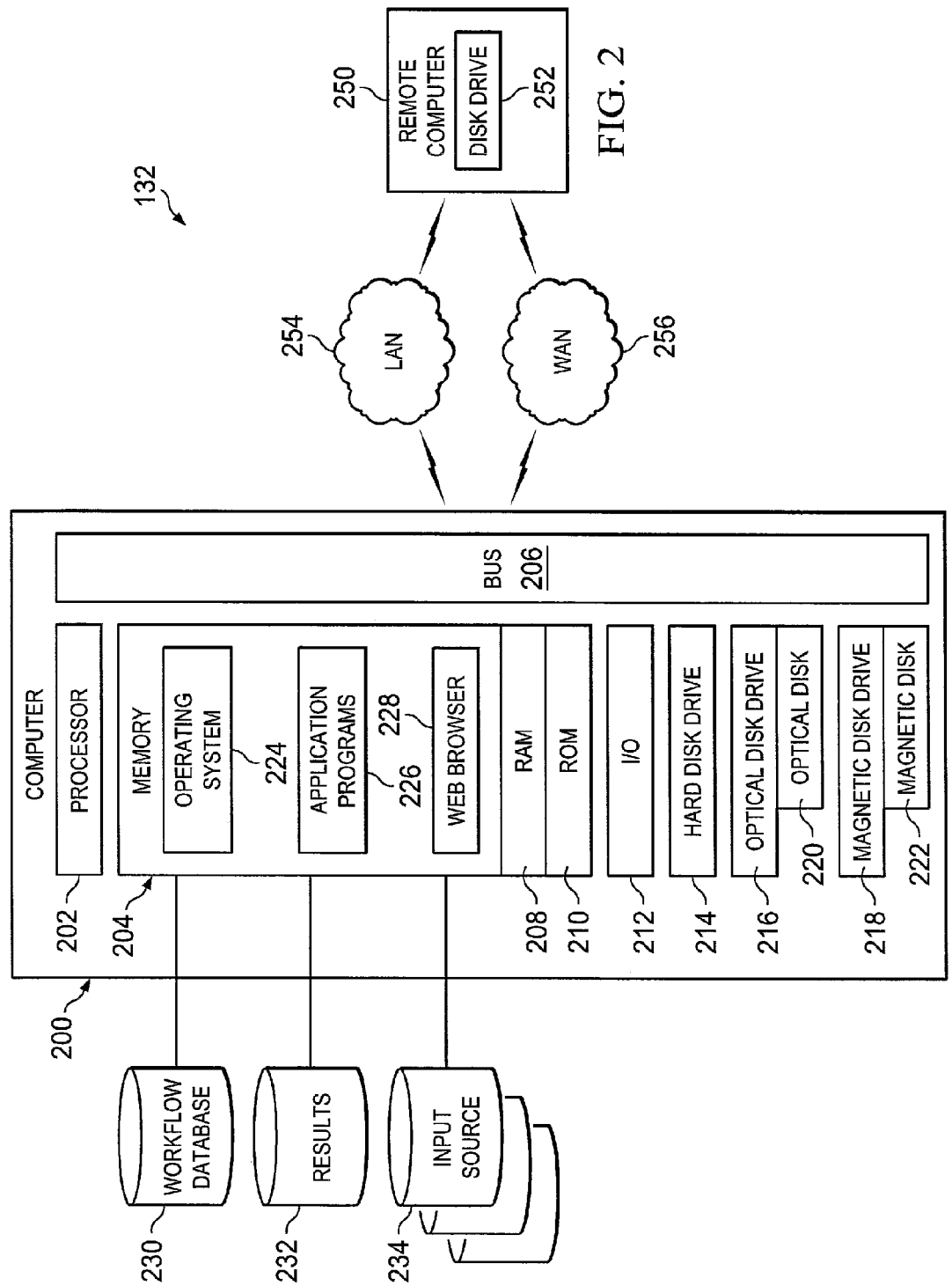
FIG. 2 is a block diagram showing an example implementation of a supporting architecture for implementing some embodiments of the workflow facility.

The underlying supporting architecture 132 provides a hardware and software framework for implementing the facility. An example implementation of the supporting architecture 132 is described in more detail with respect to FIG. 2, which is a block diagram showing various sample implementation details for the supporting architecture 132 of FIG. 1. The supporting architecture 132 may include aspects of a conventional computer 200, which includes a processing unit 202, a system memory 204 and a system bus 206 that couples various system components including the system memory to the processing unit. The processing unit 202 may be any logic processing unit, such as one or more central processing units (CPUs), digital signal processors (DSPs), application-specific integrated circuits (ASICs), etc. Unless described otherwise, the construction and operation of the various blocks shown in FIG. 2 are of conventional design. As a result, such blocks need not be described in further detail herein, as they will be readily understood by those skilled in the relevant art.

The system bus 206 can employ any known bus structures or architectures, including a memory bus with memory controller, a peripheral bus, and a local bus. The system memory 204 includes random access memory ("RAM") 208 and read-only memory ("ROM") 210. A basic input/output system (I/O) 212, which can form part of the ROM 210, contains basic routines that help transfer information between elements within the computer 200, such as during start-up. The hardware elements of the input/output system 212 allow a user to enter commands and information into the computer 200 through input devices such as a keyboard, a pointing device such as a mouse, or other input devices including a microphone, joystick, game pad, scanner, etc. (all not shown). These and other input devices are connected to the processing unit 202 through an interface such as a serial port interface that couples to the bus 206, although other interfaces such as a parallel port, game port, or universal serial bus ("USB") can be used. For example, other hardware devices, such as a PCMCIA reader that receives a card, can be coupled to the interface. A monitor or other display device is coupled to the bus 206 via a video interface, such as a video adapter. The computer 200 can include other output devices, such as speakers, printers, etc.

The computer 200 also includes a hard disk drive 214 for reading from and writing to a hard disk (not shown), and an optical disk drive 216 and a magnetic disk drive 218 for reading from and writing to removable optical disks 220 and magnetic disks 222, respectively. The optical disk 220 can be a CD-ROM, while the magnetic disk 222 can be a magnetic floppy disk. The hard disk drive 214, optical disk drive 216, and magnetic disk drive 218 communicate with the processing unit 202 via the bus 206. The hard disk drive 214, optical disk drive 216, and magnetic disk drive 218 may include interfaces or controllers (not shown) coupled between such drives and the bus 206, as is known by those skilled in the art. The drives 214, 216, and 218, and their associated computer-readable media, provide nonvolatile storage of computer readable instructions, data structures, program modules and other data for the computer 200. Although the depicted computer 200 employs a hard disk, optical disk 220, and magnetic disk 222, those skilled in the relevant art will appreciate that other types of computer-readable media that can store data accessible by a computer may be employed, such as magnetic cassettes, flash memory cards, digital video disks ("DVDs"), Bernoulli cartridges, RAMs, ROMs, smart cards, nanotechnology memory, etc.

Program modules can be stored in the system memory 204, such as an operating system 224 and other application programs 226, including various aspects of the workflow facility such as those described with respect to FIG. 1. The system memory 204 may also include a web browser 228 for permitting the computer 200 to access and exchange data with web sites in the World Wide Web of the Internet, as described below. The application programs 226, including the workflow facility, may have access to one or more databases, which may be internal or external to the computer. For example, the workflow facility may have access to a workflow database 230 (which stores designed workflows/diagrams), a results database 232 (which stores results from executed workflows), and multiple input source databases 234.

The computer 200 can operate in a networked environment using logical connections to one or more remote computers, such as a remote computer 250. For example, the computer 200 may be involved in performing a first set of tasks in a workflow and the remote computer 250 may be involved in performing a second set of tasks in the workflow. In another example, the remote computer 250 offers an input source for a workflow facility hosted at the computer 200. Likewise, the computer 200 may be involved in designing workflows having tasks to be performed by the remote computer 250. Like the computer 200, the remote computer 250 can be a personal computer, a server, a router, a network PC, a peer device, or other common network node, and typically includes many or all of the elements described above for the computer 200. Typically, the remote computer 250 includes a memory storage device such as a disk drive 252. The remote computer 250 is logically connected to the computer 200 under any known method of permitting computers to communicate, such as through a local area network ("LAN") 254 or a wide area network ("WAN") or Internet 256. Such networking environments are well known in offices, enterprise-wide computer networks, intranets, and the Internet.

In a LAN networking environment, the computer 200 is connected to the LAN 254 through an adapter or network interface (not shown) coupled to the bus 206. When used in a WAN networking environment, the computer 200 often includes a modem or other device for establishing communications over the WAN/Internet 256. In a networked environment, program modules, application programs, or data, or portions thereof, can be stored in the remote computer 250, such as in the disk drive 252. Those skilled in the relevant art will readily recognize that the network connections shown in FIG. 2 are only some examples of establishing communication links between computers, and other links may be used, including wireless links. In general, while hardware platforms, such as the computer 200 and remote computer 250, are described herein, aspects of the invention are equally applicable to nodes on a network having corresponding resource locators to identify such nodes.

III. Vector-Based Workflow System

The workflow facility may be implemented as a vector-based workflow facility, where tasks can operate on more than one record at a time. For example, in a vector-based workflow facility, a single call to a data source retrieves a collection of records for repeatable processing, as opposed to retrieval of and individual processing of one or more single records. In this way, each computation task within a workflow receives 0-N collections of records for processing as inputs at one time, and outputs 0-N records as output.

In some embodiments, the vector-based workflow facility further defines tasks as being comprised of two or more distinct components (e.g., a data handling component and a data processing component). For example, a data handling component may receive collections of data as input, manage the parsing of the collection of records into a set of single records, receive metadata parameters, manage queues of processing requests, and manage multiple instances of a data processing component. Thus, in general, the data handling component manages matters of scale for the vector-based workflow facility. On the other hand, the data processing component may perform a function on a given set of data (much like in a traditional workflow system). In this way, the data processing component does not incur the overhead of invoking multiple instances of a task. Instead, this responsibility is placed on the data handling component, which invokes multiple instances of the data processing component as needed.

Figure 3:
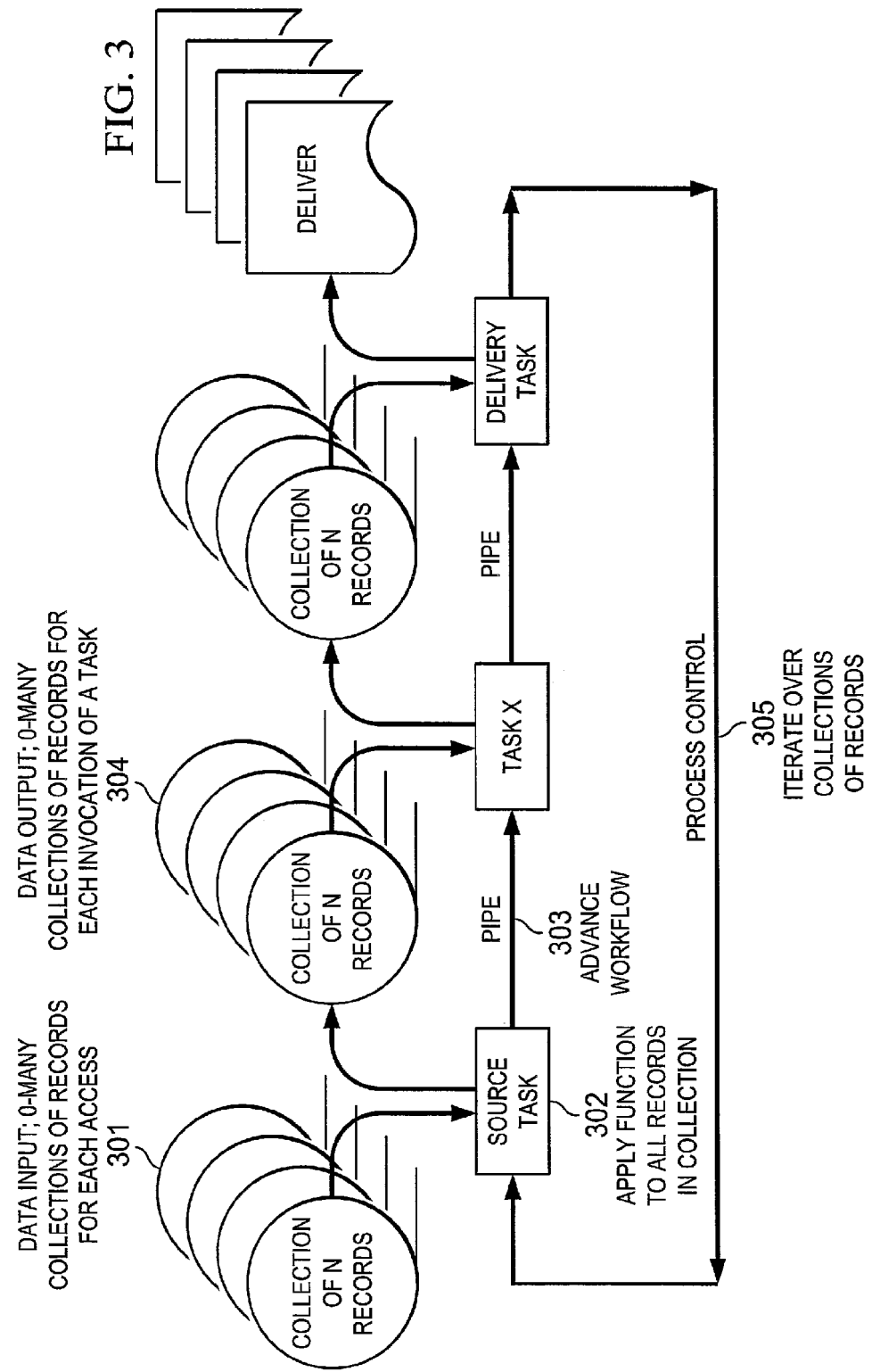
FIG. 3 is a data flow/block diagram showing aspects of a vector-based workflow facility.

FIG. 3 shows an example of a workflow iteration for a collection of retrieved records. At block 301, the facility (and more specifically the data handling component) reads in the input data one collection of records at a time. Details of an example of this process are illustrated and described with respect to FIG. 4. At block 302, the facility applies a task to each record of data, prior to advancing to the next task. More specifically, the data handling component may invoke one or more instances of a data processing component to perform the task on each record in the collection. At block 303, the facility advances to apply the task to the next collection of records. Again, multiple instances of a data processing component may be invoked to perform this task. At block 304, the facility procures data output that results from performing the tasks. Details of an example of this process are illustrated and described with respect to FIG. 5. Like the data input, this data output may include a collection of records (as opposed to a single record). At block 305, the facility iterates over additional collections of records (if there is more than one collection of records to be acted on).

As demonstrated in the above example, the vector-based workflow facility supports collections and/or sequences of input data (as opposed to single records), and hence, it executes sequences of tasks for each invocation of that task. For example, while a more typical workflow system executes a task to send one email to one recipient list, the vector-based workflow facility sends a sequence of emails, each to its own recipient list. In other words, the vector-based workflow facility supports performing tasks with respect to sequences (including very large sequences). In this way, the vector-based workflow facility enables efficiencies in workflows and supports very high throughput delivery scenarios because the overhead of the workflow facility is kept to a minimum.

Support for invoking tasks on collections or sequences of information in custom actions (e.g., tasks or actions that have been created by a designer by specifying the location of input files and extraction scripts and templates) introduces some complexity in workflow design because a designer provides additional information to describe how to combine information coming from multiple disparate sources in a workflow design database, like joins, additional inputs, filters, or custom transforms.

Figure 4:
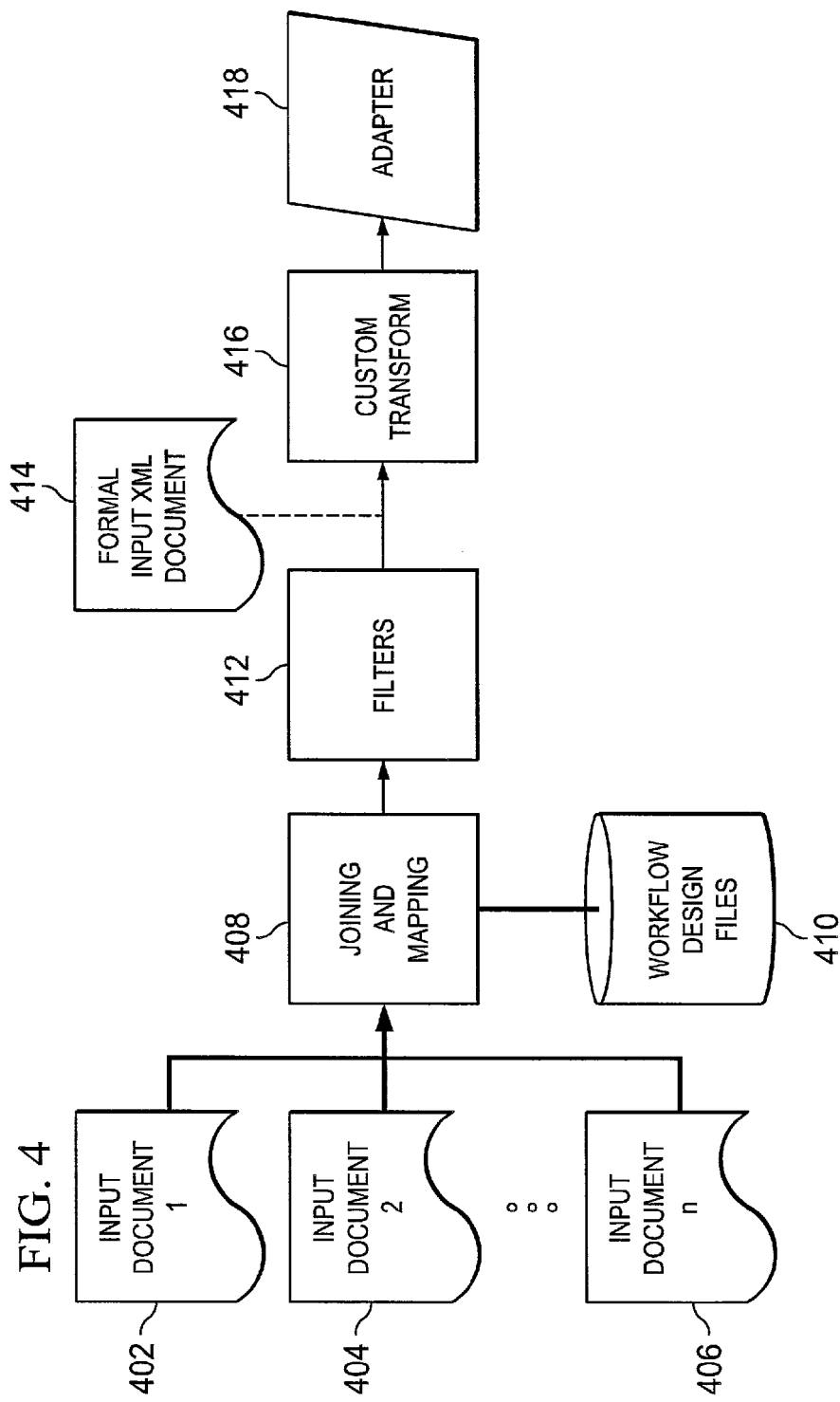
FIG. 4 is a data flow/block diagram showing aspects of assembling input data for use in a vector-based workflow facility.
Figure 5:
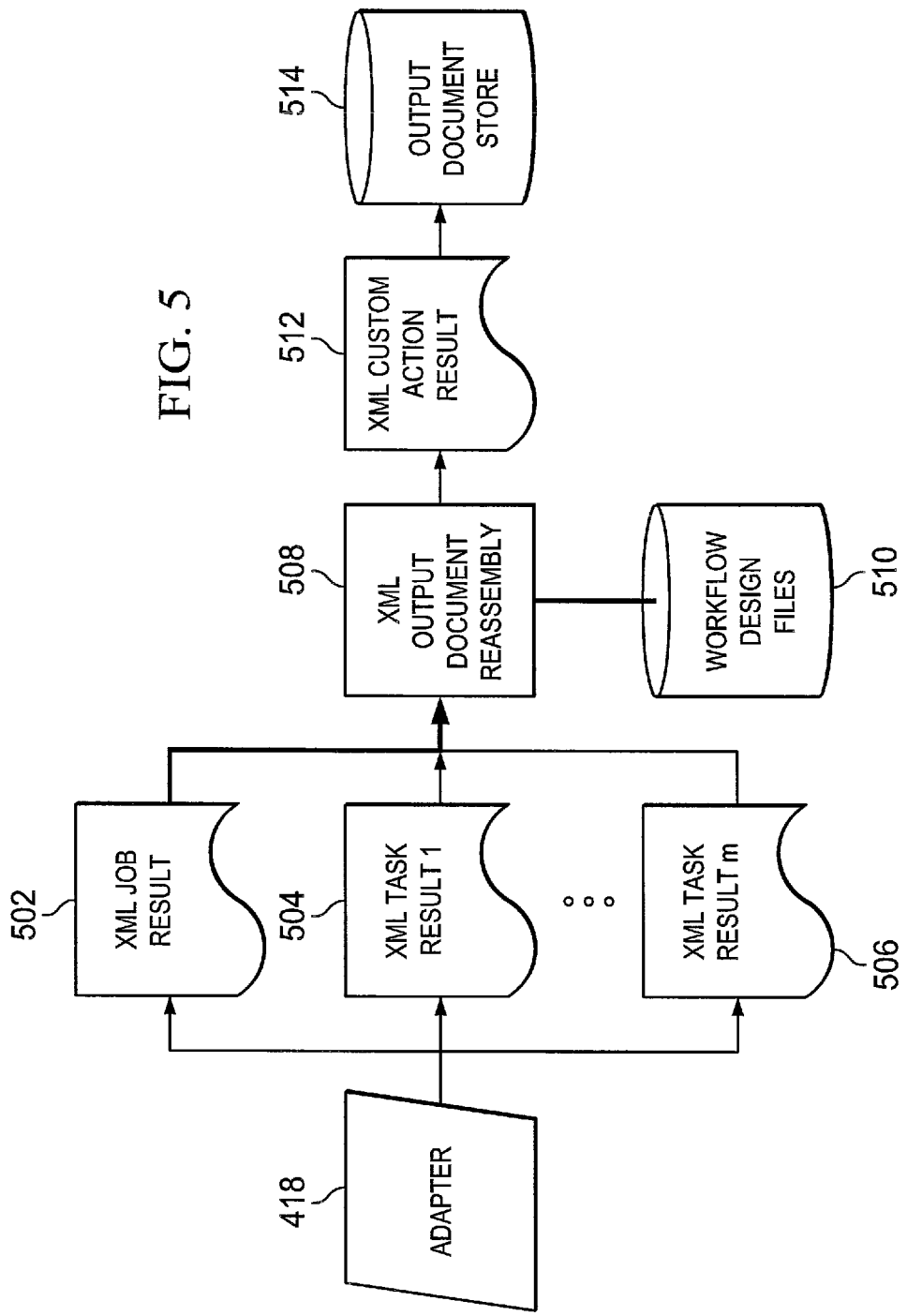
FIG. 5 is a data flow/block diagram showing aspects of assembling output data resulting from processing in a vector-based workflow facility.

FIGS. 4 and 5 illustrate examples of actions performed by a vector-based workflow facility at run-time. For example, as illustrated in FIG. 4, in some embodiments, pre-processing occurs on input (e.g., XML input) to create a formal input document that a task may act on. More specifically, joining and mapping 408 may occur with respect to a sequence of input documents (402, 404, and 406). The joining and mapping 408 may involve collecting additional input 410 from existing workflow design or input documents in a workflow design store. In some embodiments, the joining and mapping 408 may be similar to the joining and mapping described and illustrated with respect to FIGS. 6-12. The result may be a single document 414 (e.g., an XML document) that comprises one or more tasks that match the formal input schema for a data processing component or adapter 418. In addition to joining and mapping, this process may involve the use of filters 412 that limit the tasks and task data produced (e.g., do not send an invoice to customers who are being charged less than one dollar). Additionally or alternatively, the process may employ custom transforms 416 specified at design time that add an extensible and customizable mechanism to manipulate the task parameters prior to submission to the adapter (e.g., custom transformations may include almost any transformation or manipulation of the data that cannot be handled by either the joining itself or the filtering). This data (e.g., XML data) from the formal input document 414 is broken down as job and task parameters and passed to the adapter 418 for processing. In this way, the adapter 418 has all the information it needs to perform the task passed to it. In some embodiments, the adapter is designed to be product agnostic.

As illustrated in FIG. 5, after processing by the adapter 418, the workflow facility may collect task and job results (502, 504, and 506), and reassemble these resources into a single output document reassembly 508 (e.g., an XML document). In some cases, the output document reassembly 508 may incorporate information from one or more workflow design files 510. As discussed above with respect to FIG. 3, in some embodiments, not all tasks may result in the creation of output or results that are re-associated with the facility. However, in the illustrated embodiment, portions of the results are automatically extracted and persisted in a workflow storage system 514. A corresponding identifier may replace the actual content in the result 512 prior to storing.

In some instances, additional data is associated with each task result even though the additional data may not be a part of the formal input or, output schema of the adapter 418. For example, it may be desirable that each task result contain a unique identifier (e.g., InvoiceID) associated with the task result. The additional input may be part of an input document 402 used in a join operation 408. However, the formal output schema for the adapter may not contain this information. As part of the document reassembly 508, additional data not passed to the adapter may be recombined with the results and thus referenced at a later point in the workflow. This may be accomplished by associating the additional data with a unique identifier that will be output from the adapter in the task result.

Additional details associated with a vector-based workflow facility are described in commonly owned U.S. patent application Ser. No. 11/486,398, filed Jul. 12, 2006, entitled "VECTOR-BASED RECORD HANDLING, SUCH AS IN A WORKFLOW APPLICATION."

IV. Complex Data Merging

Figure 6:
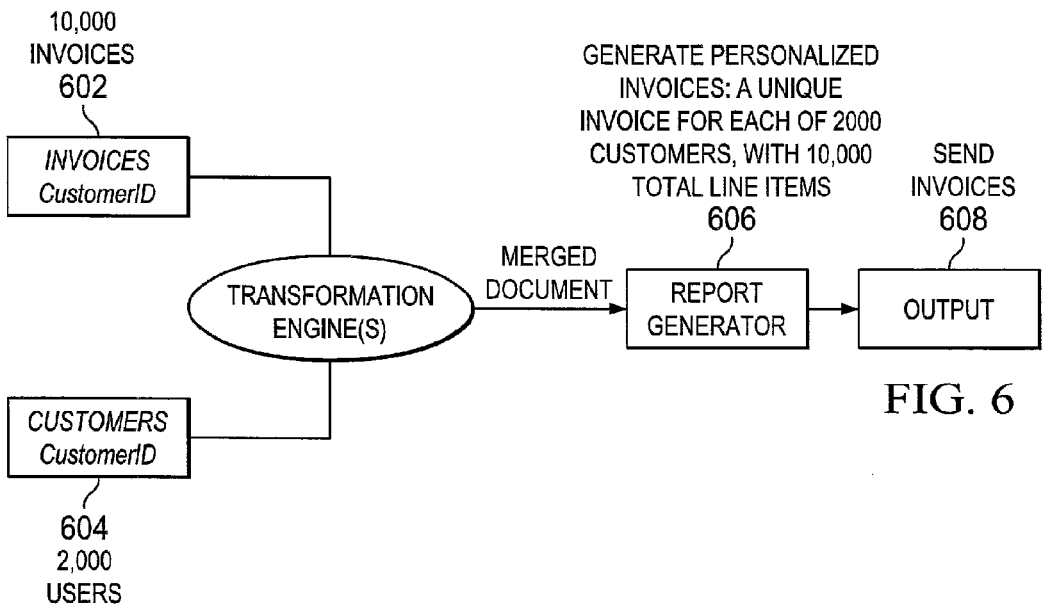
FIG. 6 is a data flow/block diagram illustrating an example of joining or merging data for use by a task of a workflow facility.

FIG. 6 shows an example of complex data merging (or joining) performed by the facility to combine information from multiple input components (e.g., XML documents), each containing sequences of information conforming to a record type, commonly known as a schema (e.g., records of results from a prior task performed by the facility). In this example, a first XML document 602 contains information relating to a sequence of 10,000 invoices for many customers, with each invoice in the sequence associated with its own record. A second XML document 604 contains information relating to a sequence of customer records for 2,000 customers, with each customer associated with at least one customer record.

In the given example, a generate report task 606 (a task controlled by the workflow facility) relies, at least in part, on the facility's complex data merging functionality to automatically complete its task of generating individual personalized invoices for each of the 2,000 users based on the information in the first XML document 602 and the second XML document 604. More specifically, after determining the existence of a parent/child relationship between the two XML documents, the complex data merging functionality identifies relationships between invoice records associated with the first XML document and customer records associated with the second XML document. For example, each invoice record associated with the first XML document 602 (in this example, the parent document) contains a customer ID field as a foreign key. The complex data merging functionality identifies and collects information for all the records with foreign key relationships and then matches each foreign key to a corresponding primary key from the customer records associated with the second XML document 604 to produce output 608 for delivery.

Use of parent/child relationships provides flexibility and allows the complex data merging functionality to be used in cases involving merging more than two input components (e.g., XML documents). In general, the parent XML document may control the size and shape of the output. For example, in the illustrated embodiment of FIG. 6, if the parent XML document is the first XML document 602 (relating to invoice records), then the merged data output 608 would be the length of the invoice sequence (e.g., 10,000 personalized invoices generated, with one customer record per invoice record). Alternatively, if the parent XML document is the second XML document 604 (relating to customer records), then the merged data output 608 would be the length of the customer sequence (e.g., 2,000 personalized invoices generated, with at least some of the personalized invoices associated with more than one invoice record per customer).

Table A below shows an example of an XML schema for the two XML documents (602 and 604) depicted in the embodiment of FIG. 6. Table A is derived from the XML schema and record types for each document. Each column conforms to a specific record type derived from the XML schema for each document. In this example, <invoices> and <users> are the record types, respectively.

TABLE A

| <invoices> | <users> |
|---|---|
| <invoice> | <user> |
| UserID + Invoice data | UserID + user data |
| </invoice> | </user> |
| <invoice> | <user> |
| UserID + Invoice data | UserID + user data |
| </invoice> | </user> |
| ... | ... |
| </invoices> | </users> |

Table B below illustrates the resultant XML output schema from the task 606 of FIG. 6. The left-hand column of the table shows the output schema when the customer XML information/document 604 is the parent document and the right-hand column of the table shows the output schema when the invoices XML information/document 602 is the parent. InvoiceData and UserData are the contents of the <invoice> and <user> elements, respectively. Such contents may themselves be elements or text, depending on the hierarchy described by the schema.

TABLE B

| User is the parent record: | Invoice is the parent record: |
|---|---|
| <user> | <invoice> |
|   InvoiceData |   UserData |
|   InvoiceData | </invoice> |
|   ... | <invoice> |
| </user> |   UserData |
| <user> | </invoice> |
|   ... | ... |
| </user> | |
| ... | |

Figure 7:
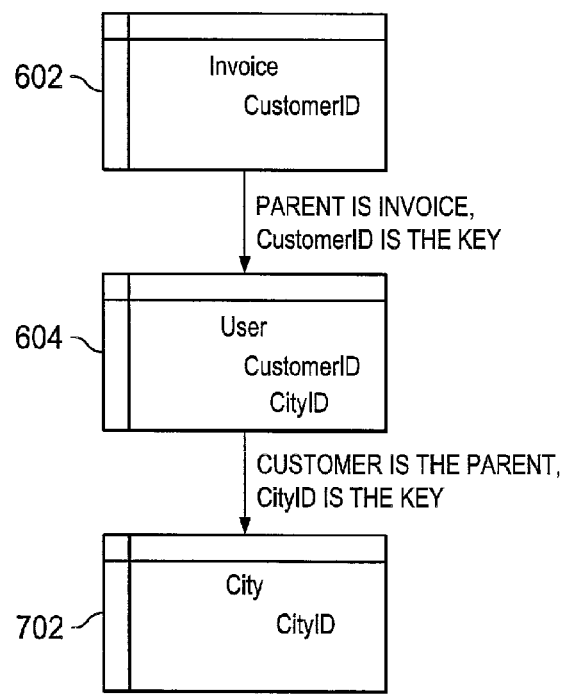
FIG. 7 is a data diagram showing an example of hierarchically related data structures that the workflow facility can merge or join.

In some embodiments involving the merging of information from more than two input components that form hierarchical relationships, the relationships among the input components having contents to be merged are identified with a single root/parent document that defines a top level sequence. In such cases, aside from the parent document, all subsequent documents participating in the merge are directly or indirectly children of the parent. The children may define their relationships with only their closest parent, as illustrated in FIG. 7. Multiple children may share the same parent, but a child does not have a direct relationship with a grandparent. For example, using the XML documents from the example of FIG. 6, the customer information of the previous example includes a city ID, and the city information is obtained from another XML document with city records 702 (also having a city ID field). However, the joining of this information may be independent of the joining of the invoice information 602 with the customer information 604.

Other sample cases include the following: In the case where only one input is used, there is no join involved since the single document is the root document. Where two documents are related purely by the order of the records in the document, it may be possible to use an implicit key relationship comprising the row number, even though the row number is not an explicit field in either record. The workflow facility may also use literal/scalar values instead of collections where a value is replicated as often as needed (e.g., a single message to be sent to all recipients of a notification). Other samples of schema that may be produced by the workflow facility are shown in Tables C and D below. In particular, Tables C and D show examples of XML that is passed from a custom action to an adapter (components of the workflow facility that are described in more detail with respect to FIG. 2). Table C shows an example of XML for a single input document.

TABLE C

```
<!-- Single Input - Invoices as Document -->
<JobRequestParameters>
    <OutputDestination>C:\folder</OutputDestination>
    <ReportFormat>PDF</ReportFormat>
    <OutputPrefix>FileName</OutputPrefix>
</JobRequestParameters>
<TaskParameters>
    <TaskParameter taskParameterID="43493fecf">
        UserID + Invoice data
    </TaskParameter>
    <TaskParameter taskParameterID="63495fefa">
        UserID + Invoice data
    </TaskParameter>
    ...
</TaskParameters>
```

Table D shows an XML example of two input documents that have been joined.

TABLE D

```
<!-- Merged Input - Invoices as Parent Document, Users as
Child Document -->
<JobRequestParameters>
    <OutputDestination>C:\folder</OutputDestination>
    <ReportFormat>PDF</ReportFormat>
    <OutputPrefix>FileName</OutputPrefix>
</JobRequestParameters>
<TaskParameters>
    <TaskParameter taskParameterID="83c93cecf">
        UserID + Invoice data + user data
    </TaskParameter>
    <TaskParameter taskParameterID="13c93c6ce">
        UserID + Invoice data + user data
    </TaskParameter>
    ...
</TaskParameters>
```

Figure 8:
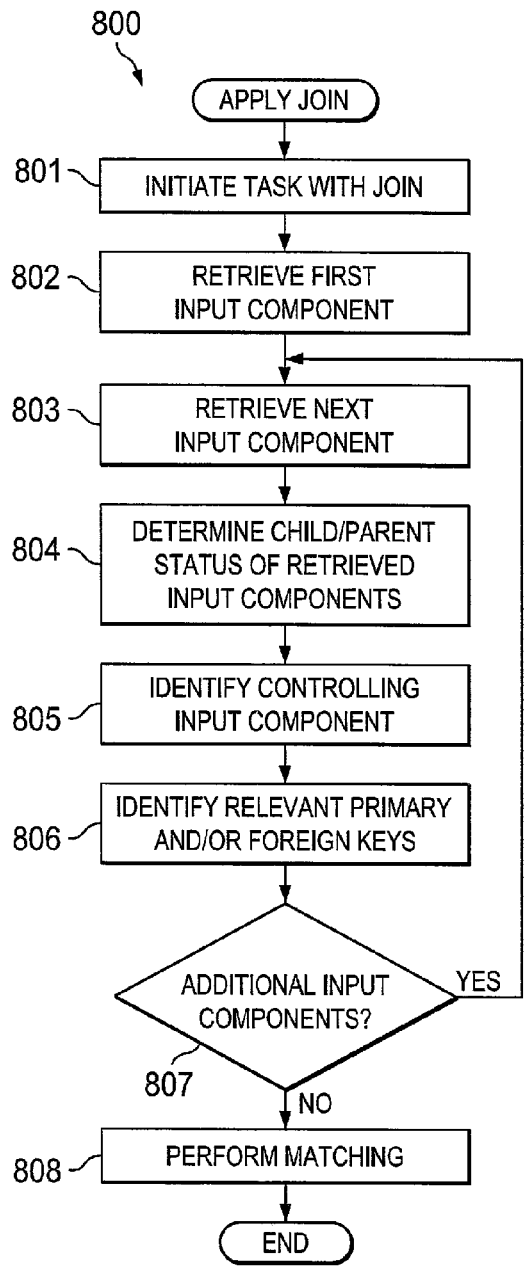
FIG. 8 is a flow diagram showing an example of applying a join or merge routine at a workflow facility in association with performing a task or action.

FIG. 8 is a flow diagram showing an example of a routine 800 for applying/executing a merge/join. The routine 800 may invoke various processes associated with the workflow facility, such as information capture processes 102, information analysis processes 104, information processing processes 106, information formatting processes 108, and information delivery processes 110 (each described in more detail with respect to FIG. 1). At block 801, the routine 800 initiates a task or action for which a join of data is imposed. This task or action may be initiated by the request of a user (e.g., through an end-user interface). For example, the task or action may be selected from a list of available tasks or actions. At block 802, the routine 800 retrieves a first input component for the join. Like the task or action, the first input component may be specified by a user via an end-user interface. An example of such an interface is depicted in FIG. 11A. At block 803, the routine 800 retrieves a next input component for the join (assuming there is more than one input component). As with the first input component, this next input component may be specified by the user via the end-user interface. In the illustrated embodiment, the end-user interface is such that programming skills are not needed to specify the input components.

At block 804, the routine 800 determines the child/parent status of each of the retrieved inputs. As with the input components, the child/parent status of each of the retrieved inputs may be specified by the user via the end-user interface without the need for programming actions (see, e.g., FIGS. 11A and 11B). At block 805, the routine 800 identifies a controlling input component based on the child/parent status of each of the retrieved inputs. This controlling input component determines the shape, size, and/or format of any resulting data outputs. At block 806, the routine 800 identifies any relevant keys/identifiers for the retrieved input components. These keys/identifiers may be specified by the user for each input component and, in most cases, represent a common data field between the first component and the next component (which may or may not share a common field name). In some embodiments, the keys/identifiers may be represented by either element data or attribute data and may have few, if any, limitations on the type of data that each key/identifier represents. For example, with respect to the first input component, the relevant key/identifier may be a UserID primary key, and for the next input component, the relevant key/identifier may be a UserID foreign key. At decision block 807, the routine 800 determines if there are additional input components needed. If at decision block 807, additional input components are needed, the routine 800 loops back to block 803 to retrieve the next input component. Otherwise, the routine 800 proceeds to block 808 to perform matching based on the identified keys/indicators. As described with respect to FIG. 1, this matching involves invoking one or more processes associated with the workflow facility, such as information analysis processes 104, information processing processes 106, and information formatting processes 108. As a result of the matching, an output may be produced, such as a single merged document. Producing this output may involve invoking, for example, the information formatting processes 108 of FIG. 1. The routine 800 then ends.

IV. Complex Data Merging User Interfaces

FIGS. 9-12 provide an illustration of the processes and user interfaces involved in implementing workflows having tasks that rely on complex data merging capabilities. In some embodiments, when creating new workflows, workflow designers may access the complex merging capabilities via a graphical user interface in a way that does not require additional programming to enable the merge of data from multiple data sources. Moreover, the complex merging functionality may be configured so that it is generally applicable to any data being passed through the system, at any time, with the shape (e.g., size and configuration) of the output data determined at run-time and driven by the results of the merging process. Thus, the complex merging capabilities are flexible in that they can be applied to a variety of data sources (including new data sources) without the need for additional programming of the workflow facility.

Figure 9:
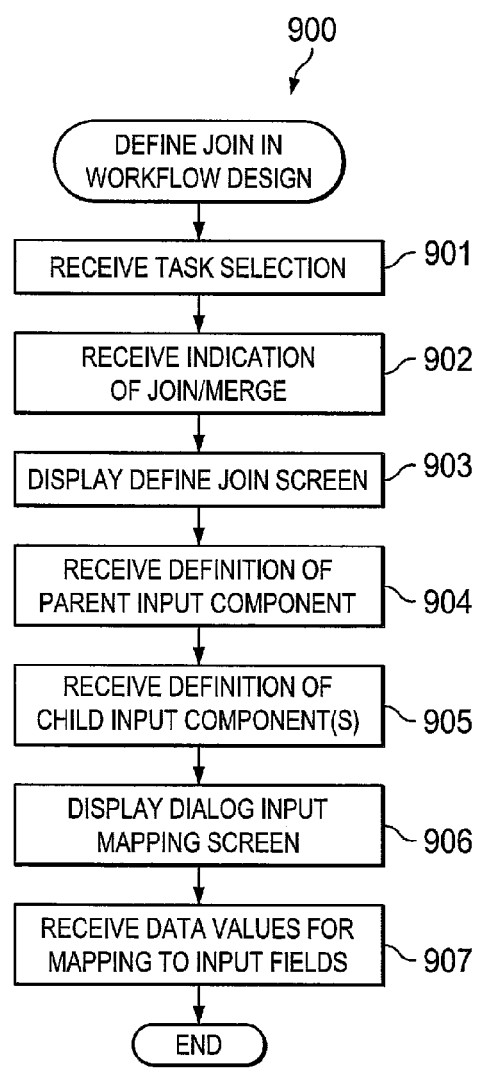
FIG. 9 is a flow diagram showing an example of a routine for designing a join or merge at a workflow facility in association with defining a task or action.

FIG. 9 is a flow diagram showing an example of a routine 900 for defining a merge/join in a workflow design, without requiring that the workflow designer write special code. At block 901, the routine 900 receives a task selection from a designer. For example, as illustrated in the display diagram of FIG. 10, the task may be a "Send Batch E-mail" task. At block 902, the routine 900 receives an indication that the task requires a joining or merging of data. An example of a screen for inputting such an indication is the screen 1000 of FIG. 10. More specifically, from the screen 1000 of FIG. 10, the user can select to edit or delete an existing join function (not shown) or create a new join function by selecting a NEW button 1002.

At block 903, the routine 900 displays a define data join screen so that the user may input information about the join or merge. Examples of define data join screens 1100 and 1150 are illustrated in FIGS. 11A and 11B. Such define data join screens may be accessed, for example, by clicking the NEW button 1002 of FIG. 10. FIG. 11B also includes a DEFINED JOINS list box 1152. If available, highlighting an item listed in the DEFINED JOINS list box 1152 populates the fields at the right side of the define data join screen 1150 with that item's settings. At block 904, the routine 900 receives definition information for a parent input component. At block 905, the routine 900 receives definition information for at least one child input component. FIG. 11A shows an example of fields that allow a user to input such information, including a PARENT DOCUMENT field 1102, a PARENT KEY field 1104, a CHILD DOCUMENT field 1106, and a CHILD KEY field 1108. Thus, as shown in FIG. 11A, receiving the definition information for a parent input component may include receiving an indication of any relevant data keys in addition to receiving document identifiers. Providing the received definition information does not require that the user perform programming activities. FIG. 11B shows an example of similar fields, including an ENTER A DESCRIPTION FOR THIS JOIN field 1154, an ENTER THE PARENT (CONTROLLING) DOCUMENT field 1156, an ENTER THE CHILD (CONTROLLED) DOCUMENT field 1158, an ENTER THE PARENT (FOREIGN) KEY field 1160, and an ENTER THE CHILD (PRIMARY) KEY field 1162. In addition, FIG. 11B displays various buttons including a WIZARD button 1164 (launches a wizard that helps a user define a join), a NEW button 1165 (inserts a new blank join in the list and highlights it so settings can be filled in and saved), a DELETE button 1166 (deletes the selected join in the DEFINED JOINS list box 1152), a SAVE button 1168 (saves the join in the DEFINED JOINS list box 1152 and/or updates the join that has been selected), a DATA BROWSER BUTTON 1170 (launches a browse box), an OK button 1172 (saves settings and closes define data join screen 1150), and a CANCEL button 1174 (aborts setting changes and closes define data join screen 1150).

At block 906, the routine 900 displays a dialog input mapping screen, through which it receives information that allows it to map data values to input fields and select corresponding joins without the need for user programming (block 907). An example of such a screen 1200 is shown in FIG. 12. In general, the dialog input mapping screen 1200 provided by the workflow facility provides an alternative and comprehensive interface for quickly specifying, viewing, referencing, and/or accessing information relating to data fields, values, and/or joins. For example, input provided using one or more of the advanced functionality screens of the illustrated embodiment (e.g., the additional data screen, the joins screen, the template input mapping screen, the filters screen, the custom transform screen, etc.) may be displayed, in whole or in part, in the appropriate fields of the dialog input mapping screen 1200. If data has not yet been provided, then the dialog input mapping screen 1200 may offer data input functionality so that, for example, a user may input missing fields or modify previously inputted fields. For example, in the case of joins, a previously defined join, which has been saved for future use, may be quickly selected/specified using the dialog input mapping functionality. In this way, the user is saved from the hassle of having to redefine a recurring join over and over again.

The information from the fields displayed on the dialog input mapping screen 1200 will eventually be used by one or more processing modules (e.g., adapter modules) to perform the underlying task (e.g., send batch email). The ability to identify and merge data that have common attributes, as described herein, can be tied to the use of specific resources in the computing environment as well. Another embodiment or application of the vector-based workflow facility described herein would be its use in conjunction with a simulation engine. The simulation engine may analyze a workflow application's overhead and/or identify potential run-time bottlenecks resulting from anticipated data handling. The simulation engine may then use the results of the analysis to set a threshold value or otherwise suggest the need for the use of vector-based operations to enhance system performance with workflow applications that are used to handle large volumes of documents or that perform operations on complex XML schema.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

This application is related to commonly owned U.S. patent application Ser. No. 10/938,396, filed Sep. 10, 2004, entitled "CUSTOM AND CUSTOMIZABLE COMPONENTS, SUCH AS FOR WORK FLOW APPLICATIONS"; commonly owned U.S. patent application Ser. No. 11/486,398, filed Jul. 12, 2006, entitled "VECTOR-BASED RECORD HANDLING, SUCH AS IN A WORKFLOW APPLICATION"; and commonly owned U.S. patent application Ser. No. 10/938,118, filed Sep. 10, 2004, entitled "USER-FRIENDLY DATA BINDING, SUCH AS DRAG-AND-DROP DATA BINDING IN A WORKFLOW APPLICATION." All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the workflow facility may vary considerably in their implementation details, while still be encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A method for complex data merging, comprising:
at a computer having a workflow facility:
retrieving, at the workflow facility, multiple input components from one or more input sources accessible by the workflow facility, wherein the multiple input components comprise a first input component and a second input component, wherein the first input component contains a first sequence of information conforming to a first record type, wherein the first sequence of information relates to a first plurality of database records of results from a first prior task performed by the workflow facility, wherein the second input component contains a second sequence of information conforming to a second record type, and wherein the second sequence of information relates to a second plurality of database records of results from a second prior task performed by the workflow facility;
determining, at the workflow facility, a parent/child status between the first input component and the second input component;
identifying, at the workflow facility, one of the first input component and the second input component as a controlling input component based on the parent/child status between the first input component and the second input component;
matching, at the workflow facility, each foreign key contained in each of the first plurality of database records associated with the first input component with a corresponding primary key from the second plurality of database records associated with the second input component; and
producing, at the workflow facility, a single merged document based on a result of the matching, wherein a shape, size, format, or a configuration of the single merged document is determined at run-time based on the controlling input component.

2. The method according to claim 1, wherein the first sequence of information comprises a sequence of invoices, with each invoice in the sequence associated with its own customer record, and wherein the second sequence of information comprises a sequence of customer records for a plurality of customers, with each of the plurality of customers associated with at least one of the customer records.

3. The method according to claim 1, wherein the first input component and the second input component are Extensible Markup Language (XML) documents.

4. The method according to claim 1, wherein the multiple input components further comprise documents, processes, and applications.

5. The method according to claim 1, wherein the multiple input components comprise content that is internal or external to the workflow facility.

6. The method according to claim 1, wherein the multiple input components comprise content that is internal to the workflow facility and content that is external to the workflow facility.

7. The method according to claim 1, wherein the one or more input sources comprise software applications.

8. The method according to claim 1, further comprising:
prior to performing the matching, determining if additional input components are needed; and
if one or more additional input components are needed, retrieving the one or more input components from the one or more input sources; or
if no additional input components are needed, performing the matching.

9. A computer program product comprising at least one non-transitory computer readable medium storing instructions translatable by at least one processor to perform, at a workflow facility:
retrieving multiple input components from one or more input sources accessible by the workflow facility, wherein the multiple input components comprises a first input component and a second input component, wherein the first input component contains a first sequence of information conforming to a first record type, wherein the first sequence of information relates to a first plurality of database records of results from a first prior task performed by the workflow facility, wherein the second input component contains a second sequence of information conforming to a second record type, and wherein the second sequence of information relates to a second plurality of database records of results from a second prior task performed by the workflow facility;
determining a parent/child status between the first input component and the second input component;
identifying one of the first input component and the second input component as a controlling input component based on the parent/child status between the first input component and the second input component;
matching each foreign key contained in each of the first plurality of database records associated with the first input component with a corresponding primary key from the second plurality of database records associated with the second input component; and
producing a single merged document based on a result of the matching, wherein a shape, size, format, or a configuration of the single merged document is determined at run-time based on the controlling input component.

10. The computer program product of claim 9, wherein the first sequence of information comprises a sequence of invoices, with each invoice in the sequence associated with its own customer record, and wherein the second sequence of information comprises a sequence of customer records for a plurality of customers, with each of the plurality of customers associated with at least one of the customer records.

11. The computer program product of claim 9, wherein the first input component and the second input component are Extensible Markup Language (XML) documents.

12. The computer program product of claim 9, wherein the multiple input components further comprise documents, processes, and applications.

13. The computer program product of claim 9, wherein the multiple input components comprise content that is internal or external to the workflow facility.

14. The computer program product of claim 9, wherein the multiple input components comprise content that is internal to the workflow facility and content that is external to the workflow facility.

15. The computer program product of claim 9, wherein the one or more input sources comprise software applications.

16. The computer program product of claim 9, wherein the instructions are further translatable by the at least one processor to perform:
prior to performing the matching, determining if additional input components are needed; and
if one or more additional input components are needed, retrieving the one or more input components from the one or more input sources; or
if no additional input components are needed, performing the matching.

17. A system for complex data merging, comprising:
at least one processor; and
at least one non-transitory computer readable medium storing instructions translatable by the at least one processor to perform, at a workflow facility:
retrieving multiple input components from one or more input sources accessible by the workflow facility, wherein the multiple input components comprises a first input component and a second input component, wherein the first input component contains a first sequence of information conforming to a first record type, wherein the first sequence of information relates to a first plurality of database records of results from a first prior task performed by the workflow facility, wherein the second input component contains a second sequence of information conforming to a second record type, and wherein the second sequence of information relates to a second plurality of database records of results from a second prior task performed by the workflow facility;
determining a parent/child status between the first input component and the second input component;
identifying one of the first input component and the second input component as a controlling input component based on the parent/child status between the first input component and the second input component;
matching each foreign key contained in each of the first plurality of database records associated with the first input component with a corresponding primary key from the second plurality of database records associated with the second input component; and
producing a single merged document based on a result of the matching, wherein a shape, size, format, or a configuration of the single merged document is determined at run-time based on the controlling input component.

18. The system of claim 17, wherein the first sequence of information comprises a sequence of invoices, with each invoice in the sequence associated with its own customer record, and wherein the second sequence of information comprises a sequence of customer records for a plurality of customers, with each of the plurality of customers associated with at least one of the customer records.

19. The system of claim 17, wherein the first input component and the second input component are Extensible Markup Language (XML) documents.

20. The system of claim 17, wherein the multiple input components further comprise documents, processes, and applications.

21. The system of claim 17, wherein the multiple input components comprise content that is internal or external to the workflow facility.

22. The system of claim 17, wherein the multiple input components comprise content that is internal to the workflow facility and content that is external to the workflow facility.

23. The system of claim 17, wherein the one or more input sources comprise software applications.

24. The system of claim 17, wherein the instructions are further translatable by the at least one processor to perform:
   prior to performing the matching, determining if additional input components are needed; and
   if one or more additional input components are needed, retrieving the one or more input components from the one or more input sources; or
   if no additional input components are needed, performing the matching.

\* \* \* \* \*

UNITED STATES PATENT AND TRADEMARK OFFICE
CERTIFICATE OF CORRECTION

| | | |
|---|---|---|
| PATENT NO. | : 8,429,527 B1 | Page 1 of 1 |
| APPLICATION NO. | : 11/486397 | |
| DATED | : April 23, 2013 | |
| INVENTOR(S) | : Emmanuel Arbogast | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this
Sixth Day of January, 2015

Michelle K. Lee
*Deputy Director of the United States Patent and Trademark Office*